G. W. Cherry.
Ventilating Hats.
N° 4122. Patented Jul. 26, 1845.
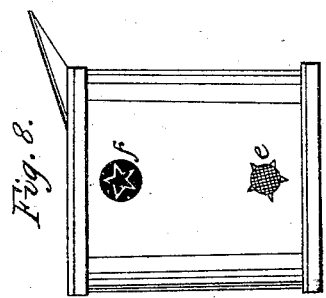
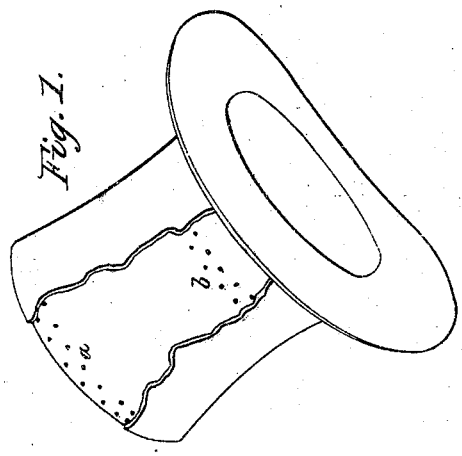
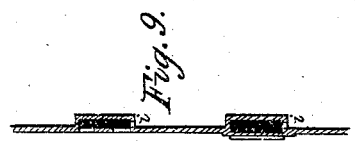
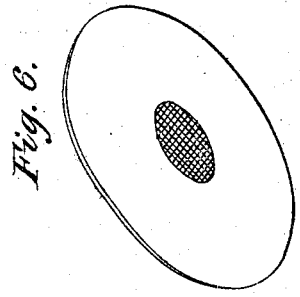
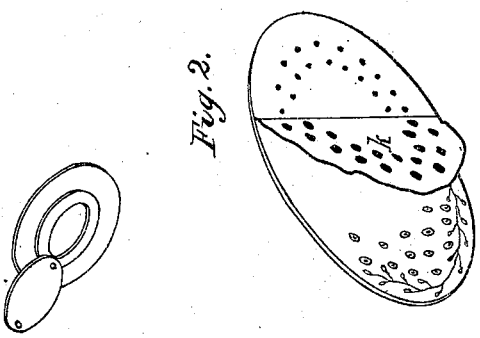
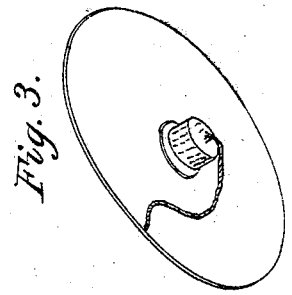
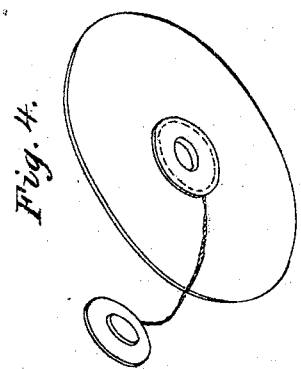
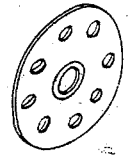

UNITED STATES PATENT OFFICE.

GEO. W. CHERRY, OF ALEXANDRIA, DISTRICT OF COLUMBIA.

VENTILATING HATS.

Specification of Letters Patent No. 4,122, dated July 26, 1845.

*To all whom it may concern:*

Be it known that I, GEORGE W. CHERRY, of Alexandria, in the county of Alexandria and District of Columbia, have invented a new and useful Improvement in Ventilating Hats; and I do hereby declare that the following is a full, clear, and exact description thereof, reference being had to the accompanying drawing.

In the modes heretofore adopted for ventilating hats they have been greatly disfigured; or they have not been perfectly ventilated; but by my method in its various modes of construction and modification, no disfigurement is made, and a perfect ventilation is effected.

Figure 1 represents a hat with a part of its outer covering removed to show two double rows of holes *a* and *b* in the side thereof, the upper rows *a*, being placed near the top, and the lower ones *b*, at a little distance above the head. These holes are punched through the body of the hat, and the outer covering is pierced, so as to give a free passage to the air, while at the same time the nap covers over the holes so as to render them invisible on the outside. In addition to the above named holes, certain other holes may be formed on the top of the hat, as represented in Fig. 2 and these I prefer to make in concentric circles near the outside, leaving the center whole for the name of the manufacturer. The holes may be punched by machinery or in any way most convenient, and are made through all but the outer covering of plush. I propose in some cases varying this construction, by making one large hole in the center of the top, and stopping it (when required in wet weather) by a cork as in Fig. 3 by a screw as in Fig. 4, or by a turning valve as shown in Fig. 5; but if no valve is used, the outer covering should be carried over the hole (see Fig. 6). Another plan is to have a circle of holes through two plates, and by turning one of them a little, to shut the holes; this is represented in Fig. 7. I also contemplate using in military or other hats an ornament in the side, placed near the top, as at *e*, Fig. 8, and another similar one *f*, a little below, which are to serve the purposes of ventilation, a cross section of these ornaments is shown in Fig. 9. A small metallic cup is inserted into a hole in the side of the hat, and projects inward through the lining; on the upper side of this cup there is an opening *i*, and its outside is covered with gauze, as shown at *e*, with an openwork star, as at (*f*), or with any other ornamental open work that shall admit the air or one star to be used and a finely perforated plate put on the top of the hat.

In all the modifications the lining should have holes in it; these are stamped through (as shown at *k*, Fig. 2) and in the top should be opposite the holes through the body. This is not necessary through the sides if the lining stands off a litle from them. The cup in Fig. 8, may pass through the lining, and no other holes will then be needed.

In making my ventilated hats of fur bodies instead of punching pieces out of said bodies, I pierce them with tapering piercers, having a plate with holes in it underneath so that the material of the body is forced away and projects inward a little— this after the plate is removed is cut off on the inside with a sharp instrument and leaves the outside map whole, to cover the holes as in the silk hats before described.

Having thus fully described my improvements what I claim as my invention and desire to secure by Letters Patent is—

1. Cutting holes through the body and lining of the hat, and leaving the outside plush whole, or merely piercing it without cutting away any portion, so that the nap shall cover sad holes, and render them invisible on the outside, while a free circulation is maintained through the hat as described.

2. I also claim, in combination with a hole, or holes, in, or near the top of the hat a hole or holes at some distance down the side of the hat, just above the top of the head, to cause a circulation through the hat as set forth.

3. I also claim the combination of the ornamental cup, with the hat as described which allows ventilation unobstructed and prevents the rain from entering.

G. W. CHERRY.

Witnesses:
J. J. GRUNAUGH,
L. CALDWELL.